(12) United States Patent
McErlean et al.

(10) Patent No.: US 10,963,482 B2
(45) Date of Patent: Mar. 30, 2021

(54) LINKING OF CONTENT BETWEEN INSTALLATIONS OF A CONTENT MANAGEMENT SYSTEM

(71) Applicant: Alfresco Software, Inc., San Mateo, CA (US)

(72) Inventors: Neil McErlean, Winchester (GB); Tuna Aksoy, Maidenhead (GB); Nick Burch, Maidenhead (GB); Michael Farman, Maidenhead (GB); Paul Holmes-Higgin, Maidenhead (GB); John Newton, Maidenhead (GB); Brian Remmington, Maidenhead (GB); Mark Rogers, Maidenhead (GB); Jan Vonka, Maidenhead (GB); David Webster, Maidenhead (GB)

(73) Assignee: Alfresco Software, Inc., San Mateo, CA (US)

( * ) Notice: Subject to any disclaimer, the term of this patent is extended or adjusted under 35 U.S.C. 154(b) by 1731 days.

(21) Appl. No.: 14/170,364

(22) Filed: Jan. 31, 2014

(65) Prior Publication Data

US 2015/0100548 A1    Apr. 9, 2015

Related U.S. Application Data

(60) Provisional application No. 61/887,277, filed on Oct. 4, 2013.

(51) Int. Cl.
| | | |
|---|---|---|
| *G06F 16/27* | (2019.01) | |
| *G06F 16/178* | (2019.01) | |
| *G06F 8/61* | (2018.01) | |
| *H04L 29/06* | (2006.01) | |
| *H04L 29/08* | (2006.01) | |

(52) U.S. Cl.
CPC ............... *G06F 16/27* (2019.01); *G06F 8/61* (2013.01); *G06F 16/178* (2019.01); *G06F 16/275* (2019.01); *H04L 63/02* (2013.01); *H04L 63/10* (2013.01); *H04L 67/1095* (2013.01)

(58) Field of Classification Search
CPC ......... G06F 17/30575; G06F 17/30174; G06F 17/30581; G06F 16/27; G06F 16/275; G06F 16/178; G06F 8/61; H04L 63/02; H04L 63/10; H04L 67/1095
USPC ....................................................... 707/610
See application file for complete search history.

(56) References Cited

U.S. PATENT DOCUMENTS

| | | |
|---|---|---|
| 9,213,718 B1 | 12/2015 | Hrebicek et al. |
| 9,349,123 B1 | 5/2016 | McNamara et al. |
| 9,652,741 B2 | 5/2017 | Goldberg et al. |

(Continued)

*Primary Examiner* — Mark E Hershley
(74) *Attorney, Agent, or Firm* — Mintz Levin Cohn Ferris Glovsky and Popeo, P.C.

(57) ABSTRACT

Content maintained in a first repository of a first installation (which can optionally be an on-premise installation) of a content management system, as well as metadata associated with the content, can be shared via an approach in which content items maintained in the first repository are synchronized with a copy of the content items maintained in a second repository of a second installation (which can optionally be a cloud-based installation). The first installation can be optionally firewall protected. The copy of the content items can be accessed by collaborative users both within and external to a firewall. Related systems, methods, products, etc. are described.

23 Claims, 5 Drawing Sheets

(56) References Cited

U.S. PATENT DOCUMENTS

| | | | |
|---|---|---|---|
| 10,503,822 B1 | 12/2019 | Spencer et al. | |
| 2002/0065879 A1* | 5/2002 | Ambrose | G06F 9/50 709/203 |
| 2003/0137536 A1* | 7/2003 | Hugh | G06F 17/30578 715/744 |
| 2003/0227487 A1* | 12/2003 | Hugh | G06F 17/30958 715/777 |
| 2005/0038687 A1* | 2/2005 | Galdes | G06Q 10/107 709/206 |
| 2010/0153482 A1 | 6/2010 | Kim et al. | |
| 2011/0066668 A1 | 3/2011 | Guarraci | |
| 2011/0137991 A1 | 6/2011 | Russell | |
| 2012/0131656 A1* | 5/2012 | Slaton | H04L 63/083 726/6 |
| 2012/0148115 A1* | 6/2012 | Birdwell | G06K 9/00 382/116 |
| 2012/0203908 A1 | 8/2012 | Beaty et al. | |
| 2012/0204169 A1 | 8/2012 | Breiter et al. | |
| 2012/0204187 A1 | 8/2012 | Breiter et al. | |
| 2012/0209947 A1 | 8/2012 | Glaser et al. | |
| 2012/0278439 A1 | 11/2012 | Ahiska et al. | |
| 2013/0097687 A1* | 4/2013 | Storm | H04L 63/0807 726/9 |
| 2013/0212067 A1 | 8/2013 | Piasecki et al. | |
| 2013/0212200 A1 | 8/2013 | Dennis et al. | |
| 2013/0226876 A1 | 8/2013 | Gati et al. | |
| 2013/0238564 A1 | 9/2013 | Tucker et al. | |
| 2013/0268357 A1 | 10/2013 | Heath | |
| 2013/0298061 A1* | 11/2013 | Bimson | G06Q 10/06 715/771 |
| 2013/0325622 A1 | 12/2013 | Kamitani et al. | |
| 2014/0006350 A1 | 1/2014 | Fukui et al. | |
| 2014/0019497 A1 | 1/2014 | Cidon et al. | |
| 2014/0074788 A1 | 3/2014 | Chatterjee et al. | |
| 2014/0115329 A1 | 4/2014 | Sturonas et al. | |
| 2014/0136635 A1 | 5/2014 | Jeng et al. | |
| 2014/0149794 A1 | 5/2014 | Shetty et al. | |
| 2014/0164315 A1 | 6/2014 | Golshan | |
| 2014/0223507 A1 | 8/2014 | Xu | |
| 2014/0279873 A1 | 9/2014 | Somerfield | |
| 2014/0281875 A1 | 9/2014 | Branton et al. | |
| 2014/0282525 A1 | 9/2014 | Sapuram et al. | |
| 2014/0325622 A1 | 10/2014 | Luk et al. | |
| 2014/0379648 A1 | 12/2014 | Chiu | |
| 2015/0012488 A1 | 1/2015 | van Rossum | |
| 2015/0012565 A1 | 1/2015 | Engberg et al. | |
| 2015/0100547 A1 | 4/2015 | Holmes-Higgin et al. | |
| 2015/0101021 A1 | 4/2015 | Mc Erlean et al. | |
| 2016/0234189 A1 | 8/2016 | Storm | |

* cited by examiner

LINKING OF CONTENT BETWEEN INSTALLATIONS OF A CONTENT MANAGEMENT SYSTEM

CROSS-REFERENCE TO RELATED APPLICATION

The current application claims priority under 35 U.S.C. § 119(e) to U.S. provisional patent application No. 61/887,277 filed on Oct. 4, 2013, the disclosure of which is incorporated herein by reference.

TECHNICAL FIELD

The subject matter described herein relates generally to content management systems.

BACKGROUND

Enterprise content management (ECM) covers a broad range of applications, including document management (DM), Web content management (WCM), records management (RM), digital asset management (DAM), search of managed content, and the like. A content management system (CMS) suitable for managing the various content (also referred to herein in some examples as "files") that an enterprise produces or generates, retains or otherwise stores, manipulates or modifies, etc. can support the requirements of one or more of such applications, and optionally other requirements, to provide a coherent solution in which content and management processes are capable of accessing content across a variety of applications subject to access controls, permissions, and the like. Content managed by a CMS can include one or more of documents, images, photos, Web pages, records, XML documents, other unstructured or semi-structured files, etc. Content retained in a CMS can also include directory structures such as folders, file trees, file plans, or the like, which can provide organization for multiple content items in addition to storing or otherwise representing relationships between content item, etc. An "enterprise" can generally refer to an organization, such as for example a business or company, a foundation, a university, or the like, and can have content requirements related to one or more business processes, content uses, etc.

A CMS manages the actual digital binary content, the metadata that describes a context of each content item, associations between a content item and other content or content items, a place and classification of a content item in a repository, indexes for finding and accessing content items, etc. The CMS can also manage processes and lifecycles of content items to ensure that this information is correct. The CMS can also manage one or more workflows for capturing, storing, and distributing content, as well as the lifecycle for how long content will be retained and what happens after that retention period.

A CMS for use in enterprise content management can include one or more of document management tools, applications, and interfaces to support general office work, search, and discovery. Workflow management capabilities of a CMS can support numerous business processes, optionally including, but not limited to, case management and review and approval. Collaboration applications and services of a CMS can support the collaborative development of information and knowledge in the creation and refinement of content and documents. Web content management services of a CMS, which can be scalable, can support the delivery and deployment of content from the enterprise to its customers. Records management capabilities of a CMS can capture and preserve records based upon government-approved or other standards. A standards-based platform can also provide access to applications that use these standards, such as publishing, image management, email management, etc.

SUMMARY

As discussed in greater detail below, features of the current subject matter can enable synchronization of content between repositories managed by separate installations of a content management system. In some implementations on-premise content maintained by or otherwise retained in an on-premise repository (optionally protected by one or more firewalls) can be synchronized with a cloud copy of that content maintained by or otherwise retained in a second repository managed by a cloud-based installation of the CMS.

Additional interrelated features relate to establishing authentication between a first repository managed by a first installation of a content management system and a second repository managed by a second installation of the content management system, linking a content item in the first repository with a copy of that content item maintained on the second repository, and synchronizing a set of metadata between the copy and the content item in the first repository via a push to the second installation of changes to the content item at the first repository for writing to the copy of the content item at the second repository, and via a pull to the first installation of changes to the copy of the content item at the second repository for writing to the content item at the first repository, the first installation initiating both the push and the pull. An external user can access the copy of the content item in the second repository based on access permissions enforced by the second installation.

In some variations, one or more of the following features can optionally be included in any feasible combination. For example, the changes associated with the linked content can include at least one of metadata changes and content changes. The on-premise repository can be protected from access by external users by a firewall, and the cloud-based tenant repository can be outside the firewall. The cloud copy can include both the content of the on-premise content and a synchronized set of metadata in common with the on-premise content. Both of the push and the pull can be initiated by the on-premise installation. The access to the cloud-based tenant repository provided to the external user can include read access, write access, or both. The on-premise content and the cloud copy can include one or more of files, folders, and directory structures. The linkage can be broken such that synchronization between the cloud copy of the on-premise content is stopped.

The synchronizing can occur periodically and can include reading from a tenant audit log that records changes to the cloud copy occurring since a previous synchronization and reading from an on-premise audit log that records changes to the on-premise content occurring since the previous synchronization. The pull can include querying the tenant audit log at the tenant repository from the on-premise installation and the push can include sending information from the on-premise audit log to the tenant. The on-premise installation can serve as a system of record for changes to the on-premise content while the tenant can serve as a system of engagement where collaborative changes to the cloud copy of the content node occur.

Implementations of the current subject matter can include, but are not limited to, methods consistent with the descriptions provided herein as well as articles that comprise a tangibly embodied machine-readable medium operable to cause one or more machines (e.g., computers, etc.) to perform operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise software system or other content management software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
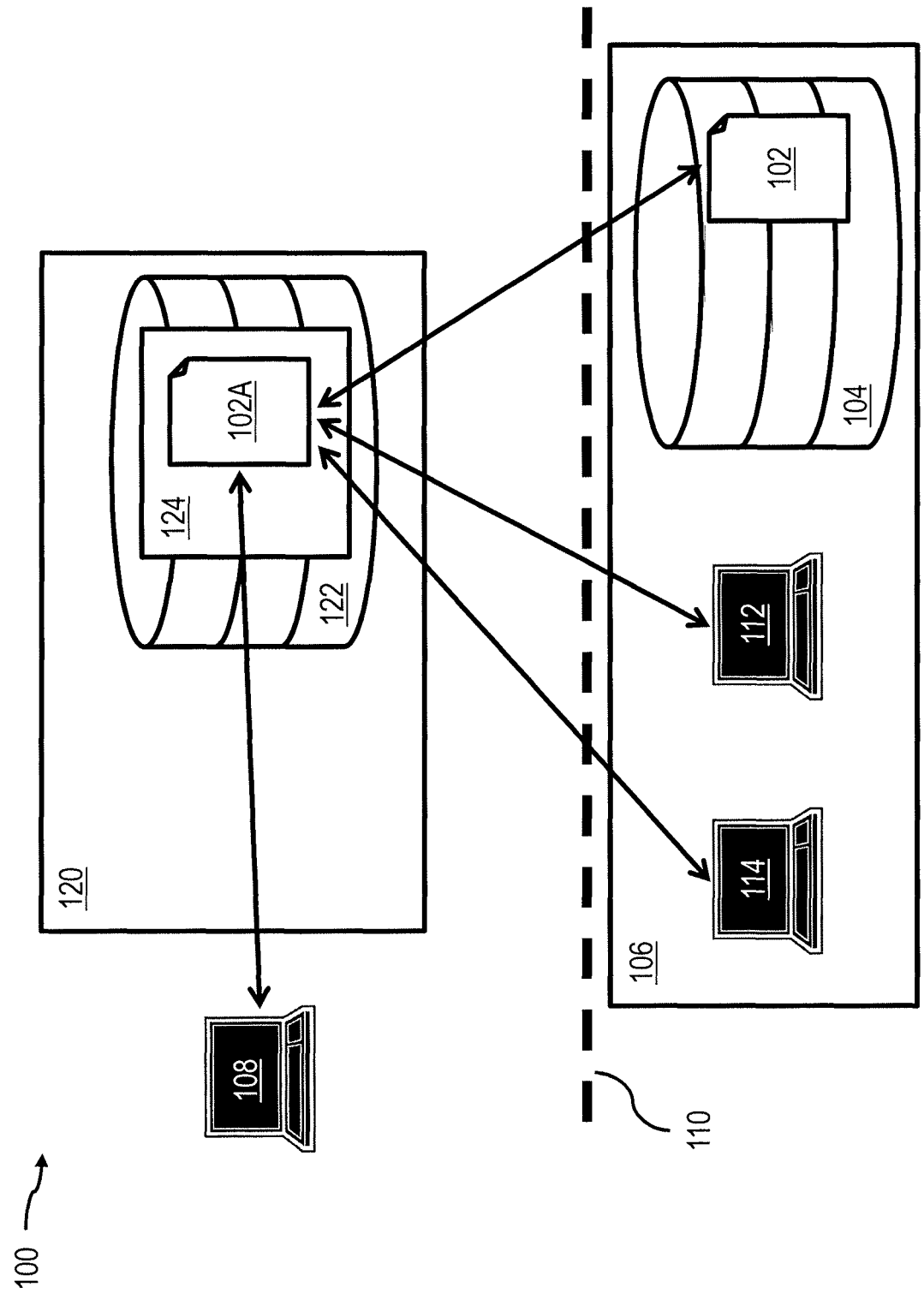
FIG. 1 shows a diagram illustrating features of a CMS architecture consistent with implementations of the current subject matter.

Currently available approaches to enterprise content management generally do not include capabilities relating to linking and synchronizing of on-premise content from an organization's content management system installation, which is typically protected by one or more network security controls, such as for example a firewall, with a cloud-based tenant site that supports collaboration between users. A typical enterprise may own or otherwise manage or have custodial responsibility for content subject to a range of access controls. Some content of the enterprise may be freely sharable, while some other content may be highly confidential or otherwise subject to significant security control. However, a third type of content of the enterprise may exist somewhere between these two extremes. As an example, a document or other content item may be confidential while also requiring collaboration with one or more users who are external to the enterprise and who therefore lack access to content maintained in a repository protected by the enterprise's firewall. Allowing such users access through the firewall is typically not preferred due to security concerns (e.g. a desire or need to constrain access by such a user only to one or more documents related to the collaboration).

Implementations of the current subject matter can address this need by supporting features relating to maintaining synchronization of content items maintained in repositories of two separate installations of a content management system. Accordingly, a secure repository, for example a first repository protected by a firewall, can maintain the enterprise's content in a secure manner while a second repository, for example a cloud-based repository accessible to users who have appropriate permissions for accessing a tenant of a second content management system outside of the firewall, can maintain a copy of at least some of the content. External users can then access the tenant according to their permissions to view and optionally modify the copy of the content. Synchronization between the content at the first repository and the copy of the content in the second repository can be achieved under the control of the first installation, for example by a pull of changes to the content copy from the second repository and a push of changes to the content in the first repository to the second repository. One or more features discussed herein or that are similar or equivalent to such features can be employed in such an arrangement.

As referred to herein, a content management system generally includes at least one programmable processor executing some form of machine-readable instructions (e.g. software code, etc.) to provide one or more content management functions. Alternatively or in addition, computer hardware can be configured to perform one or more of the operations or the like described herein. The term firewall is generally used throughout this disclosure to refer to network security controls, features, functionality, etc. that restrict access to users outside of the firewall to content retained on one or more repositories inside of that firewall.

Various implementations of the current subject matter can, among other possible benefits and advantages, provide the ability to synchronize one or more of folders, files, directory structures, or the like (also referred to herein as content items), and business processes from a first (e.g. an "on-premise") installation of a CMS to a second (e.g. a "cloud-based") CMS installation that supports permission-controlled access (optionally through the use of one or more protected collaboration sites) for users inside and outside of an enterprise. Content items can be synchronized from the on-premise CMS installation to the collaboration site hosted in the cloud CMS installation. Among other possible benefits or advantages, this feature can allow the establishment of a secure extranet for collaboration among users, enable remote (e.g., "out of the office") access for one or more users to content items retained in the on-premise CMS installation, etc. While the examples discussed below are generally framed in the context of a first, on-premise CMS installation having an on-premise repository protected by a firewall and a second, cloud-based CMS installation having a cloud-based repository, this configuration is not intended to be limiting. Rather, the current subject matter can also include content synchronizations between two cloud-based repositories maintained by two cloud-based CMS installations, between two on-premise repositories maintained by two on-premise CMS installations, and between a cloud-based CMS installation having a cloud-based repository and an on-premise CMS installation having an on-premise repository where the cloud-based installation initiates synchronization. Accordingly, elsewhere herein and in the claims, a "first installation" can be considered as a "master" CMS installation that initiates push and pull communication with a second installation, which can be considered as a "slave" CMS installation to which content is synchronized.

Services and controls for managing content of a CMS consistent with implementations of the current subject matter can include features such as metadata management, version control, lifecycle management, workflow, search, associations to other content, tagging, commenting, etc. that allow users of the CMS to find desired content items among very large content collections that can span multiple parts of an enterprise. Accuracy and consistency of the information can also be ensured, even for very large content collections across an enterprise. Content and other information in a CMS can be presented, published, etc. through the Web or any other channel appropriate to allow users to access that information.

In addition to supporting features typical of a cloud-based or "software as a service" (SaaS) software delivery model, a synchronization scheme consistent with the descriptions provided here can provide a number of desirable features. For example, the current subject matter can support automatic synchronization of content between one or more CMS-managed repositories that are inside of a firewall and a copy of one or more content items that are made accessible to authorized collaborating users of the collaboration site in the cloud. Such features can enhance ease of engagement and collaboration both between users within an organization and other collaborating users who are external to the organization.

As described in greater detail below, synchronization can be supported for individual and multiple files, folders, folder hierarchies, and other directory structures between the "on-premise" and "cloud-based" repositories. As an illustrative example, FIG. 1 shows a diagram of a synchronization architecture 100 in which on-premise content 102 stored in a repository 104 of an on-premise installation 106 of a CMS is restricted from being accessed by an external user 108 who is outside of a firewall 110. A first internal user 112 who is inside the firewall 110 has access permissions (which can include one or more of ownership, authorship, read/write permission, etc.) to the on-premise content 102. A second internal user 114 who is inside the firewall 110 can optionally be restricted from accessing the on-premise content 102, for example due to a differing role or permission set of the second internal user 114. Also as shown in FIG. 1, a cloud-based installation 120 of the CMS can include tenant-isolated access to a cloud-based repository 122. As used herein, the term "on-premise content" refers generally to content retained in the on-premise repository 104 and available for synchronization with a location (e.g. a tenant, a site, a folder, a directory tree, a document, etc.) 124 in the cloud-based installation 120. The on-premise content 102 can include a single content file or multiple content files. Alternatively or in addition, the on-premise content 102 can be synchronized at a higher directory level, such as for example by linking one or more folders, file trees, other directory structures, etc. such that a linked folder, file tree, other directory structure, etc. as well as any other content items included within the linked folder, file tree, other directory structure, etc. are replicated in the tenant as the cloud copy 102A. For a synchronized multi-level directory structure, file tree, set of folders, etc., any sub-directories, branches of the file tree, sub-folders, etc. are also replicated to the cloud copy 102A and synchronized.

Figure 2:
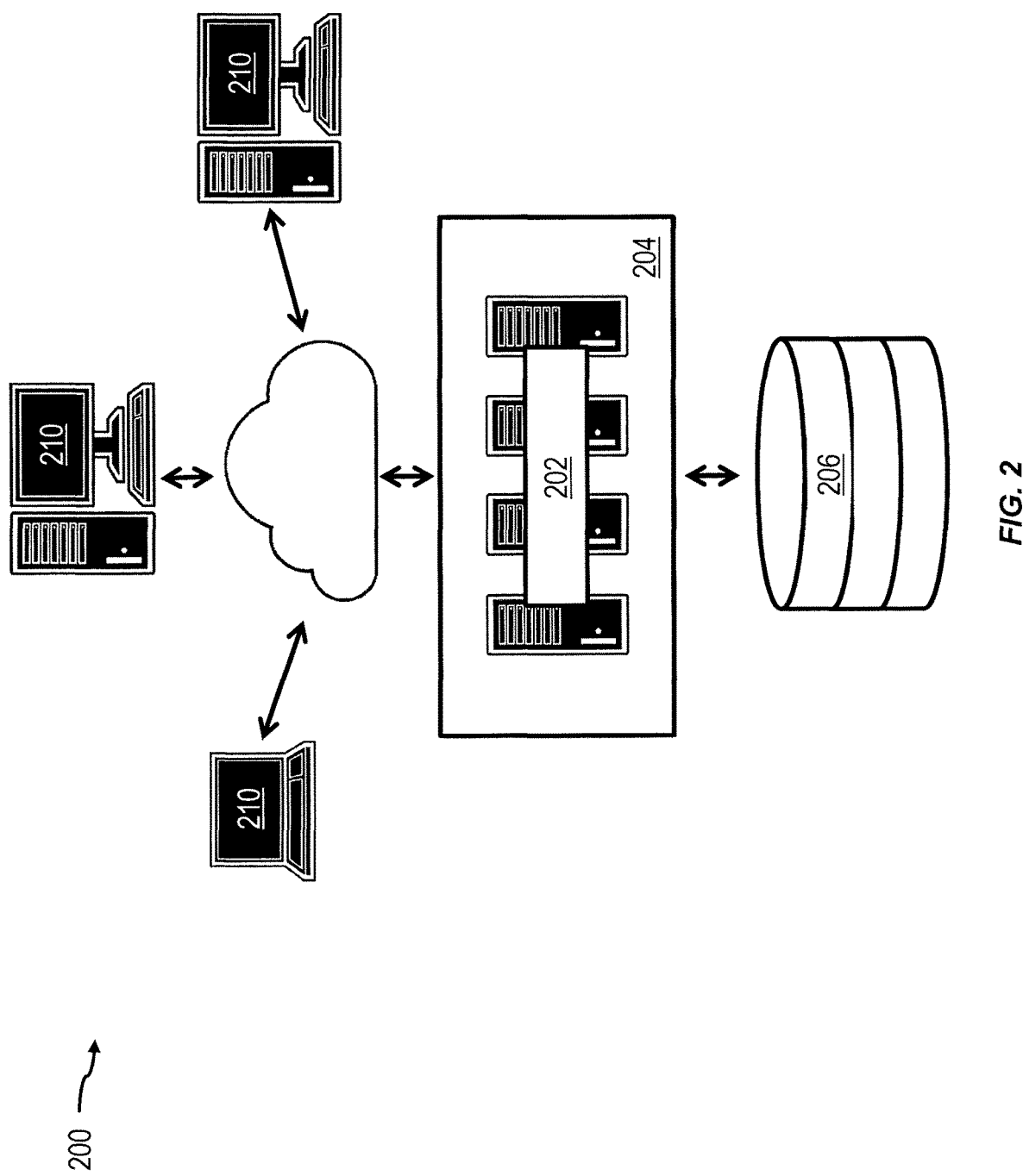
FIG. 2 shows a diagram illustrating features of multi-tenancy software installations that may relate to one or more implementations of the current subject matter.

Tenant-isolated access refers to a multi-tenancy arrangement in which an installation of a software application 202 runs on a server (or multiple servers) to support multiple client-organizations (tenants). Multi-tenancy differs from multi-instance architectures where separate software instances (or hardware systems) operate on behalf of different client organizations. FIG. 2 shows a diagram 200 illustrating a basic multi-tenant arrangement. In a multi-tenant architecture, the software application 202 running on the one or more servers 204 virtually partitions its data and configuration within one or more data storage systems 206 accessible by the one or more servers 204. The one or more data storage systems 206 can include one or more hard drives, flash memory, RAM, optical storage, or any other kind of information storing device. Each of multiple client organizations can optionally work with a customized virtual application instance supported by one of multiple tenants 210. Data in the one or more repositories 206 that are specific to a given tenant of the multiple tenants 210 are accessible only to authorized users of that tenant. Given this definition of a multi-tenancy arrangement, it will be readily understood that references herein to a cloud-based repository 122 are intended to refer broadly to data accessible to and isolated within a tenant of a multi-tenant implementation of a software as a service offering of a software application 202, which in this example is a content management system. Such a tenant can optionally be further partitioned to include discrete sites (e.g. collaboration sites) to which various users can be granted desired access permissions (e.g. read, write, delete, create, etc.)

Referring again to FIG. 1, the first internal user 112 can link or otherwise create a linkage between one or more content items of the on-premise content 102 in the repository 104 of the on-premise installation 106 of the CMS and a cloud copy 102A of the one or more content items 102. The cloud copy 102A can exist in the cloud-based repository 122 and be isolated to provide access only to authorized users of a specific location 124 within the cloud-based installation 120 of which the first internal user 112 is an authorized user. The cloud copy 102A can include both the content of the on-premise content 102 as well as a set of common metadata. One way in which content items can be linked is through definition of a synchronization set indicating which content items 102 are to be linked and also a destination to which they are to be linked. The destination can be a location 124 such as a tenant or optionally a more granular definition e.g. a site, a folder, a file, etc. The set of metadata are synchronized between the cloud copy 102A and the on-premise content 102 in the repository 104 of the on-premise installation 106 as discussed in greater detail below.

This synchronization can occur automatically. Communications necessary to ensure synchronization of changes to the set of metadata and/or to the content of the on-premise content 102 or the cloud copy 102A of the content are initiated from the on-premise installation 106 of the CMS. In other words, changes made to the content item (e.g., changes in content or metadata relating to the on-premise content 102) from inside the firewall 110 are pushed to the location 124 to be reflected in the cloud copy 102A while changes to the cloud copy 102A occurring within the location 124 are pulled to the on-premise installation 106 of the CMS to be reflected in the on-premise content 102. Exchange of the synchronization information can occur over secure communication channels, such as for example HTTPS connections or the like. Because initiation of all communication actions necessary to synchronize changes made to either of the cloud copy 102A or the on-premise content 102 occurs from the on-premise installation 106, opening of the firewall 106 is unnecessary. The first internal user (and optionally other users of the on-premise installation 106 with administrator or ownership rights to the content item) can determine one or more parameters that dictate what information can be synchronized (e.g. to ensure the sensitive content remains on-premise), how conflicting changes to one or the other of the cloud copy 102A and the on-premise content 102 are resolved, etc. Such parameters can also be defined with the synchronization set.

Consistent with some implementations of the current subject matter, a synchronization process can include establishing authentication between the location 124 and the on-premise installation 106. In some examples, authentication can be established through interaction of the first internal user 112 with one or more user interface elements, such as for example a window, navigation pane, or other display feature including one or more user interface elements, an inline prompt, etc. The first internal user 112 can be requested to supply authentication credentials on a first request to set up a synchronization between a content item held within the firewall-protected installation of the content management system, and the authentication credentials can be saved, for example in a secure credentials store or the like from which the authentication credentials can later be retrieved for use in future authentication, linking, and synchronization actions. Optionally, the authentication credentials can be checked for accuracy when they are entered to prevent, for example, an incorrect password, username, or other credentials, from being saved in the secure credentials store. In some examples, an oAuth implementation or the like can be used to establish authentication of the first internal user 112.

The first internal user 112 can be allowed to synchronize the on-premise content 102 between the firewall-protected on-premise installation 106 and a location 124 (e.g. a tenant, a site, a folder, a directory tree, a document, etc.) within the cloud-based installation 120 to which the first internal user 112 has authorized access. The location 124 can have multiple users connecting to it at the same time to allow collaboration. One or more of the multiple users can be an external user 108 or a second internal user 114 within the on-premise installation 106. The first internal user 112 can optionally be limited to storing the credentials for only the location 124.

As a further explanation, any given internal user (e.g. the first internal user 112) can have two user identifications, one for the location 124 and one for the on-premise installation 106. Multiple internal users can have permissions to access, edit, etc. the on-premise content 102 via the on-premise installation. Similarly, one or more internal users 112, 114 as well as one or more external users 108 who have or are given access to the location 124 can access the cloud copy 102A of the content item. The first internal user 112 can be capable of synchronizing the on-premise content 102 with any tenant (e.g. cloud based instance of the CMS) to which the first internal user 112 has authorized access to create and update content.

Consistent with some implementations, the first internal user 112 (e.g. the user creating a synchronized link for content 102 to the cloud) can be granted permissions for access to sites or folders within a location 124 at a finer level of granularity than per tenant. For example, a location 124 (e.g. a tenant) can include one or more "sites" as well as folders or other directory structures than can exist within separate sites in a tenant. Permissions can be defined at a site level, at a folder or subfolder level, at a directory tree or branch level, at a tenant level, etc. The first internal user 112 can, for example, be able to select a first folder (e.g. "Folder A") as a target for synchronizing but not a second folder (e.g. "Folder B"), even if both Folder A and Folder B are inside the same site in a same tenant or other location 124 that includes sub-structures such as sites, folders, directories, etc. These permissions can optionally be defined within the synchronization set.

Similarly, while a tenant can contain many sites, the first internal user 112 may only be able to see a subset of those sites, and may be able to create and update content in an even smaller subset of those sites. Implementations of the current subject matter can support access controls such as these or other comparable scenarios, and in general allows an on-premise user to sync content only to a location 124 in the cloud-based installation (e.g. a tenant+a site within the tenant+a folder within the tenant, or the like) to which they have create and edit permissions.

Once authentication between the tenant or other location 124 and the on-premise installation 106 is established, the first internal user can select one or more content items 102 to be linked between the on-premise installation 106 and the tenant or other location 124. In one example consistent with implementations of the current subject matter, this selection can be accomplished through an on-premise document library, which generally refers to a user interface view of a file directory structure that enables user navigation through content items accessible within the repository 104 of the on-premise installation 106. The first internal user 112 can select one or more folders or files (e.g. content items—the term files is also herein interchangeably with content items) to sync through interactions with document library functionality.

Synchronization between on-premise content 102 and a cloud copy 102A of that content can be based on a concept of synchronization sets, which generally include a group of one or more files, folders, etc. that sync to a particular location and optionally also include other information about access permissions, destinations for the synchronized copies of the content items, rules for synchronization, etc. If the first internal user 112 selects multiple content items (e.g. files) for linking between the on-premise installation 106 and the location 124, these multiple files can be grouped together as a single synchronization set. If the first internal user 112 selects only one file, a synchronization set containing a single node will be created. The term node is used herein to refer to a file, a folder, or other content items as it is represented in a repository (either the on-premise repository 104 or the cloud repository 122). A user that creates a synchronization set (e.g., the first internal user 112 in the example described here) owns that synchronization set, which uses that user's cloud credentials to synchronize the files included in the synchronization set between the on-premise repository 104 and the cloud-based repository 122. Linkages between content in the on-premise repository 104 and the tenant can be established for individual files or for folders or other file directory structures that can contain multiple individual files and/or subfolders.

As noted above, synchronization of changes occurring to either of a cloud copy 102A or the on-premise content 102 itself occurs via a push/pull process that is initiated from the on-premise installation 106. Pushing and pulling of changes can be accomplished on a synchronization set by synchronization set basis. In some examples, synchronization management can be accomplished on an individual file basis while the synchronization sets are managed by the system. In other implementations, administrator and/or user level synchronization set management features can be made available. Synchronization management actions (such as for example un-synchronizing a cloud copy 102A and on-premise content 102 in the on-premise repository 104) are generally required to be performed at the same file directory level included by the first internal user 112 within the original linkage. For example, if the first internal user 112 links a folder (e.g. a file directory structure that can contain one or more files or sub-folders) as part of a synchronization set, un-synchronizing of content within the folder occurs atomically rather than on an item or sub-folder basis for content or subfolders within the folder.

Figure 3:
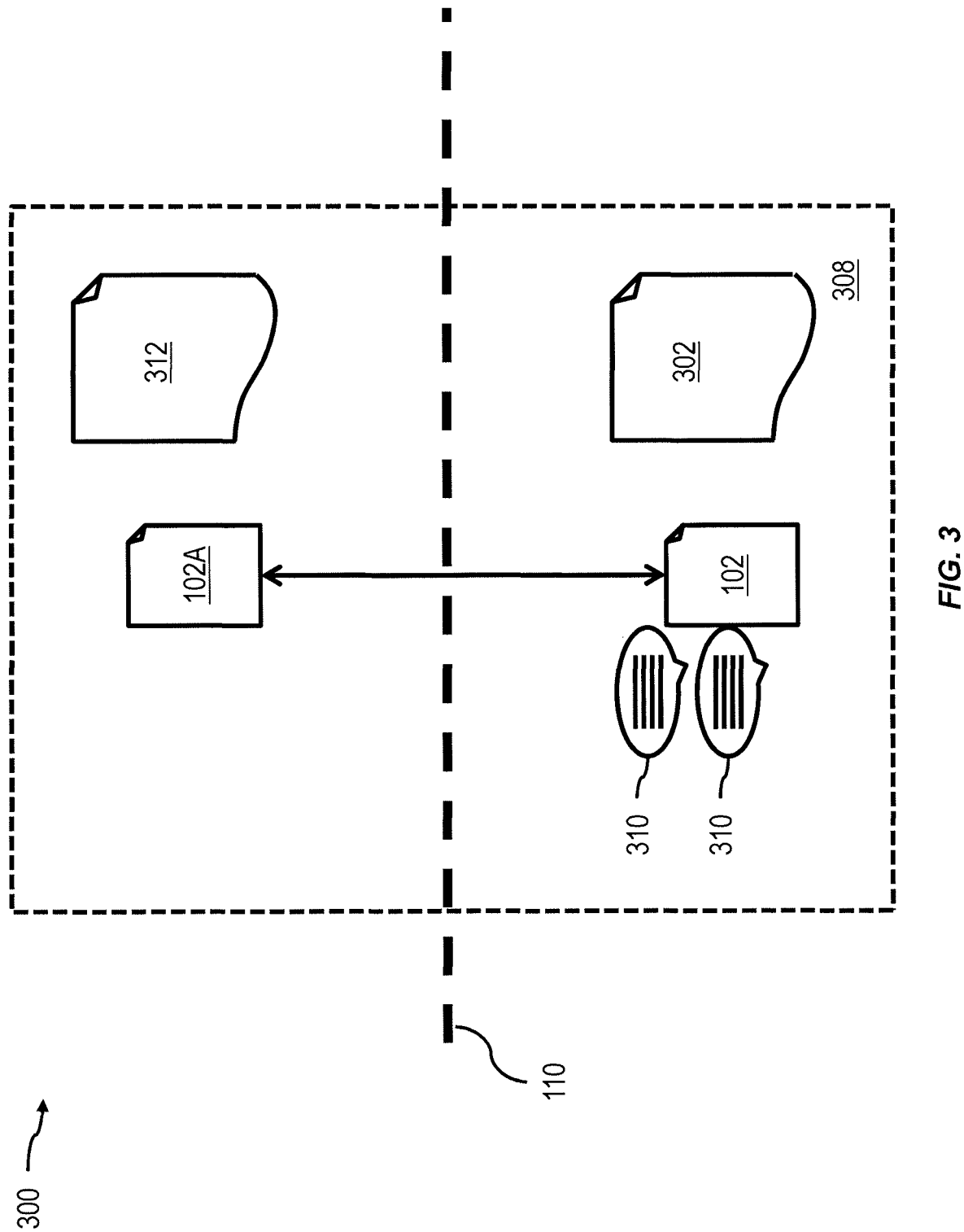
FIG. 3 shows a diagram illustrating features of synchronization sets and audit logs consistent with implementations of the current subject matter.

As illustrated in FIG. 3, synchronization of changes between the cloud copy 102A and on-premise content 102 can be facilitated through the use of change auditing based on an on-premise audit log 302 maintained for on-premise content 102 to be synchronized and a tenant audit log 312 maintained for the cloud copy 102A. When a content node 102 (e.g. a file, content item, etc.) is added to a synchronization set 308, a marker aspect 310 can be associated with the content node 102 such that changes to the content node 102 or its synchronization set membership triggers an entry in the on-premise audit log 302 for the synchronization set 308. The first entry in the on-premise audit log 302 for a synchronization set 308 can include the addition of the content node 102 to the synchronization set 308, thereby triggering creation of the cloud copy 102A of the node on the location 124. Periodically (e.g. on some time interval, which need not be constant and can in one example be approximately every 10 seconds or the like) the on-premise audit log 302 is checked for changes and any synchronization changes found are sent (e.g. pushed by the on-premise CMS installation 106) to the location 124. Changes to the synced cloud copy 102A are also stored in a tenant audit log 312 and are pulled by the on-premise installation periodically (e.g. approximately every 60 seconds or the like).

Consistent with some implementations of the current subject matter, changes occurring to either the on-premise content node 102 or the cloud copy 102A can be aggregated such that a "final" state of the node 102 is pushed from the on-premise installation 106. This "final" state of the content node 102 at each push event can be retained as a version to the extent that any changes have occurred since the previous push communication. Versions need not be created for each interim state between sequential communications of entries in either of the on-premise audit log 302 or the tenant audit log 312. However, a version of the node 102 can be explicitly created each time a change is pushed, even if the change includes only a property change and even if the on-premise repository 104 is configured to not retain versions for changes that only include property changes.

The on-premise audit log 302 and the tenant audit log 312 can each have a relatively fine level of granularity regarding changes made to either of the content node 102 or the cloud copy 102A of the content node. In other words, rather than merely recording that a change has occurred to a content node (either on-premise or in the cloud), the respective audit logs 302, 312 can record the specific properties of the node that have changed. As an example, a content node can include associated metadata. If a user, either in the tenant or other location 124 or on-premise, makes a change that affects a property of the associated metadata, this specific change can be recorded in the appropriate audit log 302, 312. On the next push or pull communication sequence initiated by the on-premise installation 106 to synchronize the on-premise content 102 with the cloud copy 102A, only those parts of the metadata for which a change has occurred are pushed or pulled to or from the location 124. The audit logs 302, 312 can therefore be considered as a queue of deltas to content and/or metadata of a content node 102 (or to a cloud copy of the content node) that have occurred since a last successful synchronization communication between the on-premise installation 106 and the location 124.

The messaging exchanged between the on-premise installation 106 and the location 124 to relay entries in the audit logs 302, 312 can optionally include an aggregated set of a plurality of deltas that are not mutually inconsistent. In other words, a synchronization message can include a set of queued deltas that can be applied atomically. If two conflicting changes are reflected in one of the audit logs 302, 312 (e.g. if two different users made conflicting changes to a title or other metadata of the content node 102), the conflicting changes are not packaged into a single message but are instead communicated separately. In this manner, a "current" synchronized version of the content node 102 or cloud copy 102A of the content node can be assembled based on a single message exchanged at each push or pull synchronization. This assembly of a synchronized version can be made possible by the atomicity of the messages, which prohibits the inclusion of conflicting delta information. The separate communication of any conflicting delta information can result in potentially inconsistent versions of the content node 102 or cloud copy 102A. These inconsistent versions can be handled according to conflict resolution rules. Examples of such rules can include designating that either the most recent version of the cloud copy 102A or the most recent version of the on-premise content node 102 always "wins" in a conflict, giving precedence to changes made by a certain user or type of user if a conflict occurs, etc.

The node content and any properties from content models that exist both in the location 124 (i.e. in the cloud-based repository 122 accessible to the location 124) and in the on-premise repository 104 can be synchronized. When the synchronization is established, a list of metadata to be synchronized can be explicitly enumerated. This list of metadata can be defined globally, such that a content node 102 having the enumerated metadata properties synchronizes those properties with a synchronized cloud copy of the content node 102.

Multiple on-premise repositories can synchronize content independently of one another to multiple tenants in the cloud. It is also possible for multiple distinct on-premise repositories to synchronize content into different locations in a single location 124 (e.g. a tenant). Accordingly, the tenant audit log 312 for a given tenant can include changes relevant to synchronization sets for on-premise content for multiple on-premise repositories including the on-premise repository 104 shown in FIG. 1. Consistent with illustrative implementations of the current subject matter, pull synchronization can involve communications between the on-premise installation 106 and the location 124 at two levels of granularity. For communication efficiency and data security reasons, the on-premise repository 104 can make periodic requests to the location 124 for a high-level "change manifest" of relevant changes. This change manifest can include a coarse-grained listing of any content item changes that are relevant for that particular on-premise repository 104 but need not include any information on changes that are relevant to other on-premise repositories besides the on-premise repository 104. For example, the coarse-grained listing can optionally include identifiers of content items that have changed, and/or identifiers of synchronization sets containing content items that have changed without including specifics about the changes themselves. The specifics can be requested to be sent in a second communication using the identifiers provided in the change manifest. Examples of irrelevant changes can include, but are not limited to, changes to content items synchronized with other on-premise repositories. The server or servers hosting the multi-tenant, cloud-based instance of the CMS can support this functionality, for example through storage in tenant audit logs 312 of a source repository identifier for each change and through audit log queries which can be filtered by the source repository identifier. For example, the source repository identifier, which identifies a on-premise repository 104 to which a copy 102A in the cloud repository 122 is linked, can be provided when the synch-set is initially created in the tenant, site, folder, etc. in the cloud and never changes.

In this manner, an on-premise repository 104 can request a change manifest and only be notified of synchronization sets having that particular on-premise repository 104 as their origin and actually containing unpulled changes. In the event that the change manifest is empty, no further communications from the on-premise repository 104 to the cloud server are required until the next periodic check begins. In the event that the change manifest contains any synchronization set identifiers, the on-premise repository 104 can then request more detailed change information from the location 124 (e.g. in the form of a more fine-grained set of change descriptions that includes a detailed record of changes to any content item indicated in the change manifest) and perform the actual synchronization of content and/or metadata by modifying the changed content items based on the received set of change descriptions.

As a simplified example of this communication, a first on-premise repository 104 can send a message or other communication to the location 124. The message can include an identifier of the first on-premise repository 104 and an inquiry regarding whether the tenant audit log 312 includes any synchronization changes relevant to content held in the first on-premise repository 104. The location 124 (e.g. a tenant, a site, etc.) can reply with a manifest including identification information for any synchronization sets relevant to the inquiring on-premise repository 104 (e.g. "changes have occurred in synchronization sets 1, 2, 4, and 42"). Optionally, the reply can also include an identifier of one or more content items within the synchronization set that have experienced a change since a last synchronization.

The first on-premise repository 104 can then request a detailed set of change descriptions relevant to its synchronization set 1, and the location 124 can reply with the requested detail so that the first on-premise repository 104 can write the pulled changes to the affected on-premise content 102, optionally with conflict handling and acknowledgement sent to the location 124 that the changes were successfully pulled. This pull process can then be repeated for the other synchronization sets identified in the manifest (e.g. synchronization sets 2, 4, and 42 in this example).

If a node is synchronized as part of a folder synchronization, then the directory structure is also synchronized (e.g. the directory structure in the location 124 remains the same as the directory structure on-premise). However, if a content node is synchronized individually, then just the content node 102 and its cloud copy 102A are synchronized such that location of the content node 102 within the directory structure both on premise and at the tenant can be changed by moving the cloud copy 102A of the content node. Changing of a directory structure location of the cloud copy 102A in the tenant can cause an equivalent change to occur to the on-premise content node 102 through synchronization.

Further to the above discussion, in the case where a folder structure or other director structure is synchronized, a file that is located inside that folder structure can be moved to another location within the same folder structure. When that happens, the move can be reflected correctly at the other end of the synchronization link. Additionally, if a file inside that synchronized folder structure is moved outside of that folder structure in the on-premise repository, then that file is removed from the synchronization set and can be removed from the location 124 in the cloud. If a file inside one synchronized folder structure is moved into a different synchronized folder structure in the on-premise repository 104, then that file can be removed from the first synchronization set and added to the second synchronization set. These two changes can then be reflected in the linked locations (e.g. in a tenant or multiple tenants as it is possible that the second synchronization set is linked to a different tenant than the tenant of the location 124).

The first internal user 112 who established the synchronization of on-premise content 102 with the location 124 can choose at a later time to unsynchronize the linked content node 102 from the cloud copy 102A. When this unsynchronization occurs, the marker aspect 310 associated with the content node 102 is removed and an unsynchronization record is added to the on-premise audit log 302. Deletion of the content node 102 from the on-premise repository 104 can also result in the unsynchronization record being added to the on-premise audit log 302. When the CMS on-premise installation 106 queries the on-premise audit log 302 for changes, it finds the node unsynchronization record and pushes it to the location 124 just as any other change. The cloud copy 102A can optionally be deleted upon receipt at the location 124 of the unsynchronization record. Alternatively, the cloud copy 102A can be retained at the tenant. However, further changes to the cloud copy 102A are not pulled back to the on-premise content node 102, as the synchronization link has been removed, or in some cases the on-premise content node 102 has been deleted.

In some examples, an on-premise content node that is synchronized with a cloud copy 102A at the location 124 can be locked such that only changes to the cloud copy 102A are allowed. In other words, while the on-premise content node 102 is synchronized with the cloud copy 102A, the on-premise node 102 is available only for read access. This approach can assist in maintaining consistency in versions of the content node 102. Both external users 108 and first and second internal users 112 and 114 (as well as other internal and external users) can collaborate using a collaboration site established in the tenant. The on-premise installation 106 of the CMS can thereby serve as the system of record for changes to the content node 102 while the location 124 (e.g. a tenant, site, folder, etc.) serves as a system of engagement where collaborative changes to the cloud copy 102A of the content node occur. The changes to the cloud copy 102A are periodically pulled back to the on-premise installation for recording and versioning. The cloud copy 102A can hold the most up-to-date version of the content. The on-premise copy 102 can "lag behind" the cloud copy 102A, so after a change is made in the cloud repository 122 there exists a short period of time during which the on-premise content 102 does not reflect the latest version in the location 124.

It is possible for a content node 102 and its cloud copy 102A to have both changed substantially concurrently (e.g. during the time delay between sequential push or pull synchronization communications). Consistent with implementations of the current subject matter, an assumption can be made that the short period between synchronization communications makes conflicts unlikely. To facilitate collaboration in the cloud, conflicts can be resolved based on a "Cloud wins" approach to conflict resolution. If a file changes at both the on-premise side and the tenant substantially simultaneously, then the on-premise node 102 can be versioned and overwritten with the cloud copy 102A. The changed state of the on-premise content node 102 is not lost—versioning of this state ensures that a full log of changes is retained to allow later resolution or inclusion of partially conflicting changes. A user can view the version history and can revert or update as necessary.

Other features consistent with implementations of the current subject matter can address error handling in the event of a communication failure between the on-premise installation 106 and the location 124. When synchronization of a linked content node 102 with its cloud copy 102A fails, an error aspect 314 (see FIG. 3) can be applied to the on premise content node 102. The error can be transient (e.g. a temporary communications failure with the tenant, an authentication failure, etc.) or a more "permanent" hard error that require a user interaction to solve (e.g. a name conflict in the sync folder or a permissions change meaning that a target folder is no longer writable). In either of those cases, an appropriate error aspect 314 (e.g. indicative of a transient error or a hard error) is applied to the on-premise content node 102, and the user can be notified through one or more user interface indicators (e.g. in a document library screen). The error aspect 314 can affect how the audits work. When a transient error occurs, the on-premise audit log 302 continues to keep a record of changes such that the system automatically recovers when the transient error is resolved. The location 124 can be unaware of the transient error due to communications all beginning from the on-premise installation. As such, the tenant audit log 312 can continue to record changes to the cloud copy 102A of the content node during the transient error, and these changes can be pulled back to the on-premise installation 106 upon resolution of the transient error.

When a hard error occurs, the on-premise audit log 302 clears current entries, stops recording changes, and only resumes when the user manually requests a re-synchronization. A re-synchronization request triggers a full push of the content node 302 if the content node include the hard error aspect 314. If the push of the content node 102 fails again, then the error aspect will be reapplied.

Figure 4:
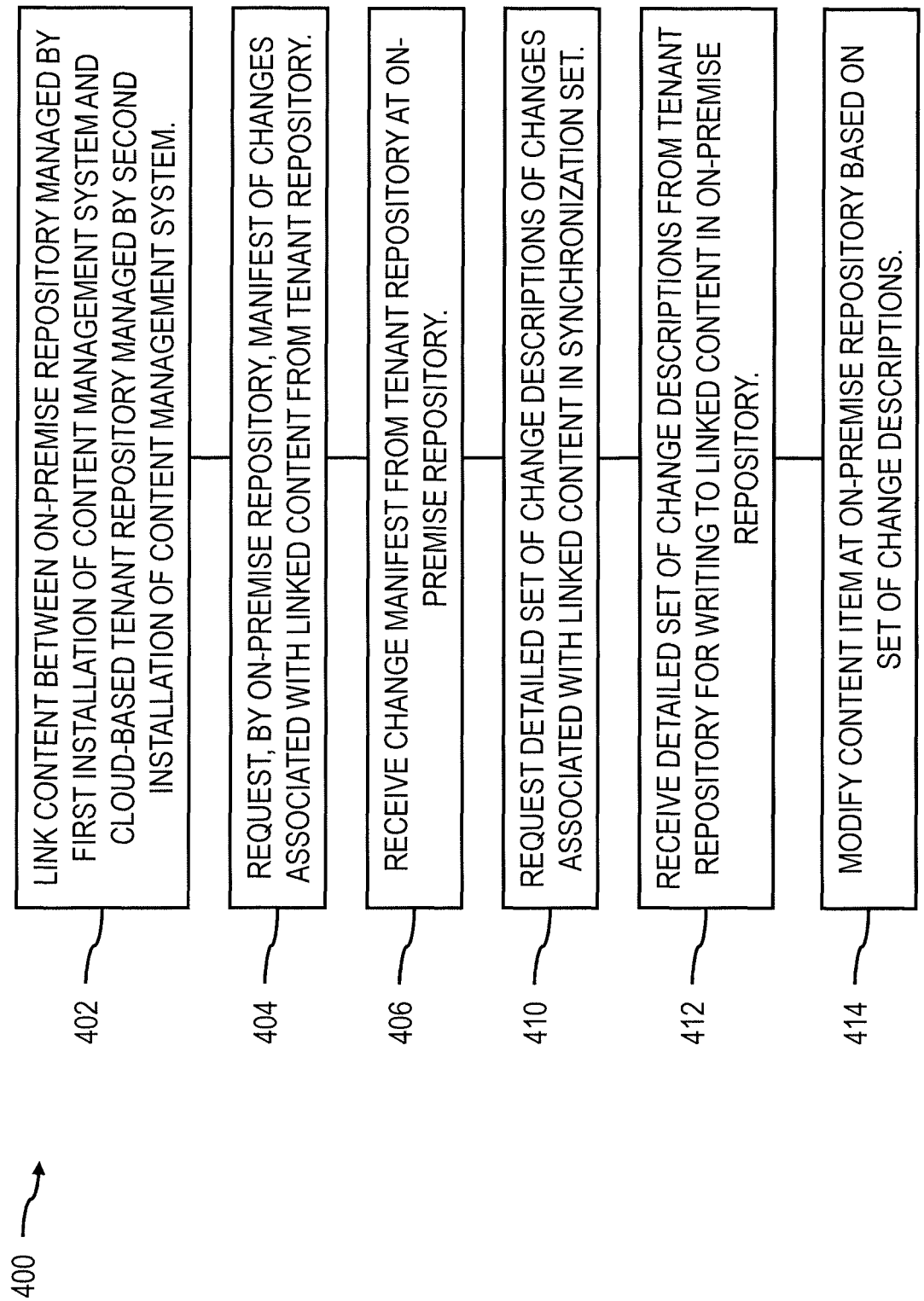
FIG. 4 shows a process flow diagram illustrating aspects of a method having one or more features consistent with implementations of the current subject matter.

FIG. 4 shows a process flow chart 400 illustrating features that can be included in a method consistent with implementations of the current subject matter. At 402, content (e.g. content items) is linked between a first (optionally an on-premise) repository managed by a first installation of a content management system and a second (optionally a cloud-based or tenant) repository managed by a second installation of the content management system. As discussed above, the on-premise repository can be protected from access by external users by a firewall, and the cloud-based tenant repository can be outside the firewall. One or more synchronization sets can define the content to be synchronized between the first repository and the second repository.

At 404, the first repository can request a change manifest listing changes associated with the linked content from the second repository, for example by sending a request for a change manifest to the second installation of the content management system managing the second repository. The request can include a repository identifier identifying the first repository. The changes associated with the linked content can include at least one of metadata changes and content changes.

In response to the request, the first repository can receive the change manifest from the second repository at 406. The change manifest can include a synchronization set identifier identifying a synchronization set that includes a content item of the linked content that has been changed at the second repository subsequent to a previous synchronization between the first repository and the second repository. The change manifest can also optionally include a content item identifier identifying the content item that has been changed at the second repository.

At 410 the first repository requests a detailed set (e.g. a record) of change descriptions of the changes associated with the linked content in the synchronization set. These changes associated with the linked content include changes made at the second repository to the content item identified by at least the synchronization set identifier and optionally by the content item identifier.

At 412, a set of change descriptions that includes the detailed record of changes to the content item is received at the first installation from the second installation. The detailed set of change descriptions can be configured to be written to the linked content in the first repository. At 414, the content item at the first repository can be modified based on the set of change descriptions.

Figure 5:
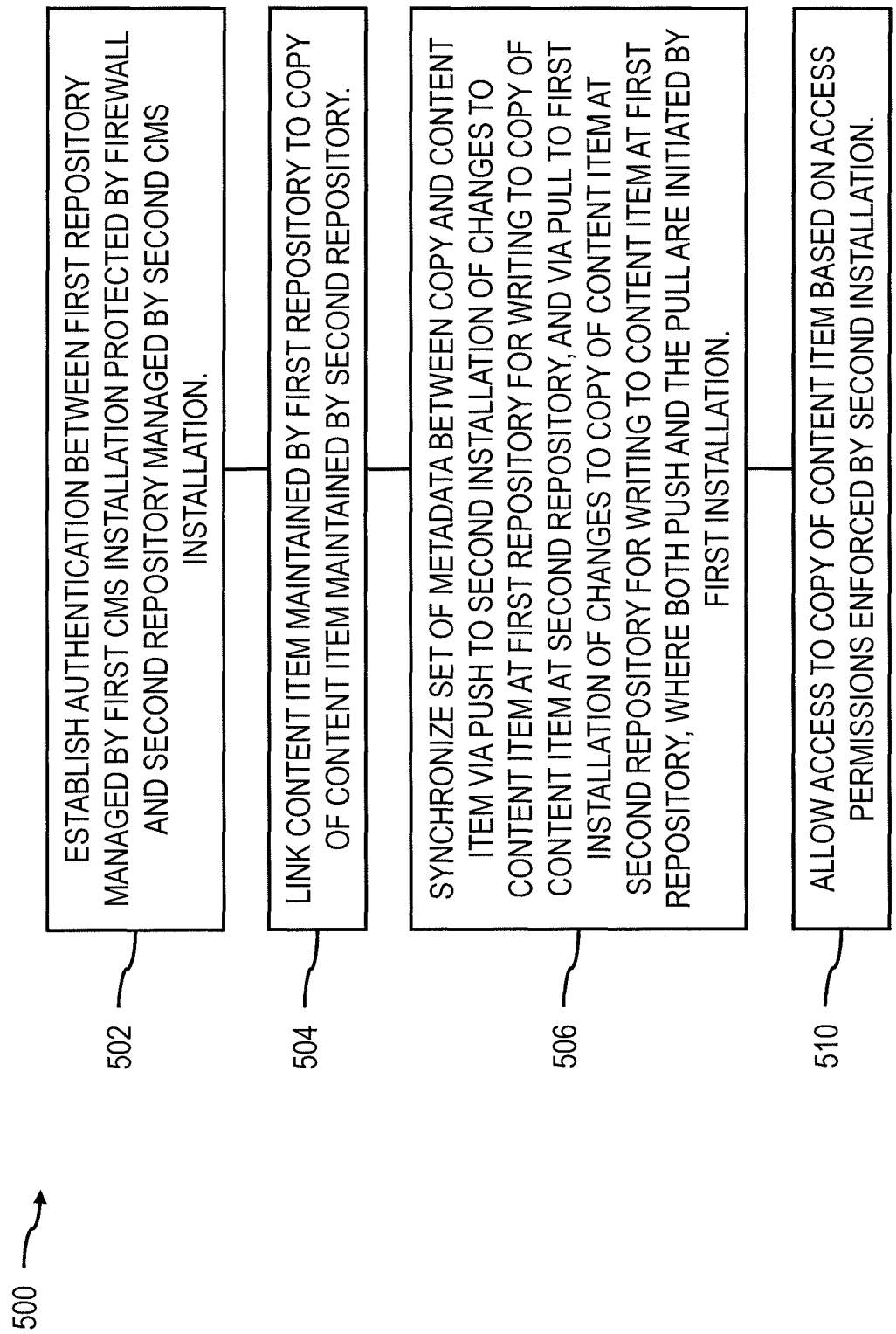
FIG. 5 shows another process flow diagram illustrating aspects of a method having one or more features consistent with implementations of the current subject matter.

FIG. 5 shows another process flow chart 500 illustrating features that can be included in a method consistent with implementations of the current subject matter. At 502, authentication is established between first (optionally on-premise) repository managed by first (optionally on-premise) installation of a content management system and a second (optionally cloud-based tenant) repository managed by a second (optionally cloud-based) installation of the content management system. The first installation can be protected from access by an external user by a firewall or other security protocol that limits access from users who are not inside the firewall.

At 504, a linkage is created between on-premise content in the on-premise repository and a cloud copy of the on-premise content that exists in a collaboration site maintained on the cloud-based tenant repository. In other words, a content item maintained by the first repository is linked with a copy of the content item maintained by the second repository. The copy includes both the content of the on-premise content and a set of metadata in common with the on-premise content and is accessible by an external user subject to one or more access controls enforceable by the second installation.

The set of metadata are synchronized between the copy of the content item and the content item in the first repository at 506. The synchronizing occurs via a push of first changes to the content to the tenant for writing to the cloud copy and via a pull of second changes to the cloud copy for writing to the on-premise content. Both of the push and the pull are initiated by the on-premise installation.

At 510, access to the cloud copy is allowed for the external user, which can optionally include inviting the external user to a site, a tenant, a folder, or the like. More generally, access for the external user can be based on based on access permissions enforced by the second installation, which can be defined by an internal user who has permissions to both of the first installation and the second installation. For example, access can be based on input from an internal user who requests or otherwise initiates the linking of the content item and the copy, or can be defined based on access permissions in a structure (e.g. a site, a folder, a directory sub-tree, etc.) that already existed at the second installation and that was designated as a destination for the linked copy of the content item. The structure can optionally be a public site accessible to an external user with sufficient network access. The copy of the content item and the content item can be unsynchronized by breaking the linking between them.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean "based at least in part on" such that an unrecited feature or element is also permissible.

Other implementations than those described herein may be within the scope of the following claims.

What is claimed is:

1. A computer program product comprising a non-transitory machine-readable medium storing instructions that, when executed by at least one programmable processor, cause the at least one programmable processor to perform operations of a first installation of a content management system, the operations comprising:

establishing authentication between a first repository managed by the first installation and a second repository managed by a second installation of the content management system, the first installation being protected by a firewall preventing access to the first repository by an external user;

linking a content item maintained by the first repository with a copy of the content item maintained by the second repository such that the copy of the content item is accessible by an external user subject to one or more access controls enforceable by the second installation, the copy comprising both content of the content item and a set of metadata in common with the content item at the first repository; and synchronizing the set of metadata between the copy of the content item and the content item in the first repository, the synchronizing occurring via a push to the second installation of changes to the content item at the first repository for writing to the copy of the content item at the second repository, and via a pull to the first installation of changes to the copy of the content item at the second repository for writing to the content item at the first repository, the first installation initiating both the push and the pull.

2. A computer program product as in claim 1, wherein the access controls are defined based on either or both of an input from an internal user of the first installation who initiates the linking of the content item and the copy of the content item, and an access permission defined for an existing structure at the second installation that is designated as a destination for the copy of the content item.

3. A computer program product as in claim 1, wherein the linking further comprises:
adding the content item to a synchronization set;
associating a marker aspect with the content item at the first repository when the content item is added to the synchronization set; and
adding an entry in a first audit log for the synchronization indicating addition of the content item the synchronization set, the adding of the entry triggering a first push synchronization to the second installation to create the copy of the content item at the second repository.

4. A computer program product as in claim 3, wherein the operations further comprise: unsynchronizing the copy of the content item and the content item, the unsynchronizing comprising removing the marker aspect from the content item at the first repository and adding an unsynchronization record to the first audit log.

5. A computer program product as in claim 4, wherein the unsynchronizing further comprises pushing a removal node from the first installation to the second installation, the removal node causing the second installation to delete the copy of the content item upon receipt of the removal node.

6. A computer program product as in claim 4, wherein the unsynchronizing further comprises pushing a removal node from the first installation to the second installation, the removal node causing the second installation to retain the copy of the content item without further reporting of changes made to the copy back to the first installation.

7. A computer program product as in claim 1, wherein the synchronizing occurs periodically and comprises receiving from the second installation a change manifest generated from a second audit log that records changes to the copy of the content item at the second repository occurring since a previous synchronization and reading from a first audit log that records changes to the content item at the first repository occurring since the previous synchronization.

8. A computer program product as in claim 7, wherein the pull further comprises querying the second audit log from the first installation and the push further comprises sending information from the first audit log to the second installation.

9. A computer program product as in claim 1, wherein the first installation serves as a system of record for changes to the content item and the second installation serves as a system of engagement where collaborative changes to the copy of the content item occur.

10. A computer program product as in claim 1, wherein the content item and the copy of the content item comprise one or more of a file, a folder, and a directory structure.

11. A computer program product as in claim 1, wherein the linking further comprises creating a synchronization set defining content for synchronization between the first repository and the second repository, the defining comprising selecting the content item for inclusion in the synchronization set and a destination in the second repository to which the content item in the synchronization set is to be synchronized.

12. A computer program product as in claim 1, wherein the first repository comprises an on-premise repository protected from access by external users by a firewall, and the second repository comprises a cloud-based tenant repository outside of the firewall.

13. A computer program product as in claim 12, wherein the cloud-based tenant repository comprises a plurality of sites, and wherein a synchronization set defines content for synchronization between the first repository and the second repository, the synchronization set comprising the content item for inclusion in the synchronization set and a site of the plurality of sites in the second repository as a destination to which the content item in the synchronization set is to be synchronized.

14. A computer program product as in claim 1, wherein the synchronizing further comprises:
sending a request for a change manifest from the first installation to the second installation, the request comprising a repository identifier identifying the first repository;
receiving the change manifest from the second repository at the first repository, the change manifest comprising a synchronization set identifier identifying a changed synchronization set of the one or more synchronization sets, the changed synchronization set comprising the content item which has had its copy changed at the second repository subsequent to a previous synchronization between the first repository and the second repository;
requesting from the second repository based on the change manifest, a detailed record of changes made at the second repository to the content item identified by the content item identifier; and
receiving, at the first repository from the second repository, a set of change descriptions comprising the detailed record of changes.

15. A computer program product as in claim 1, wherein the establishing authentication comprises verifying that an internal user of the first installation has authorized access to a destination for the copy of the content item at the second installation, the verifying comprising at least one of receiving authentication credentials provided by the first user and retrieving the authentication credentials from a credentials store.

16. A system comprising:
computer hardware configured to perform operations of a first installation of a content management system, the operations comprising:

establishing authentication between a first repository managed by the first installation and a second repository managed by a second installation of the content management system, the first installation being protected by a firewall preventing access to the first repository by an external user;

linking a content item maintained by the first repository with a copy of the content item maintained by the second repository such that the copy of the content item is accessible by an external user subject to one or more access controls enforceable by the second installation, the copy comprising both content of the content item and a set of metadata in common with the content item at the first repository; and synchronizing the set of metadata between the copy of the content item and the content item in the first repository, the synchronizing occurring via a push to the second installation of changes to the content item at the first repository for writing to the copy of the content item at the second repository, and via a pull to the first installation of changes to the copy of the content item at the second repository for writing to the content item at the first repository, the first installation initiating both the push and the pull.

17. A system as in claim 16, wherein the computer hardware comprises at least one programmable processor and a machine-readable medium storing instructions that, when executed by the at least one processor, cause the at least one programmable processor to perform the operations.

18. A system as in claim 16, wherein the linking further comprises:
adding the content item to a synchronization set;
associating a marker aspect with the content item at the first repository when the content item is added to the synchronization set; and
adding an entry in a first audit log for the synchronization indicating addition of the content item the synchronization set, the adding of the entry triggering a first push synchronization to the second installation to create the copy of the content item at the second repository.

19. A system as in claim 16, wherein the first repository comprises an on-premise repository protected from access by external users by a firewall, and the second repository comprises a cloud-based tenant repository outside of the firewall.

20. A system as in claim 19, wherein the cloud-based tenant repository comprises a plurality of sites, and wherein a synchronization set defines content for synchronization between the first repository and the second repository, the synchronization set comprising the content item for inclusion in the synchronization set and a site of the plurality of sites in the second repository as a destination to which the content item in the synchronization set is to be synchronized.

21. A system as in claim 16, wherein the synchronizing further comprises:
sending a request for a change manifest from the first installation to the second installation, the request comprising a repository identifier identifying the first repository;
receiving the change manifest from the second repository at the first repository, the change manifest comprising a synchronization set identifier identifying a changed synchronization set of the one or more synchronization sets, the changed synchronization set comprising the content item which has had its copy changed at the second repository subsequent to a previous synchronization between the first repository and the second repository;
requesting from the second repository based on the change manifest, a detailed record of changes made at the second repository to the content item identified by the content item identifier; and
receiving, at the first repository from the second repository, a set of change descriptions comprising the detailed record of changes.

22. A computer-implemented method comprising:
establishing authentication between a first repository managed by a first installation of a content management system and a second repository managed by a second installation of the content management system, the first installation being protected by a firewall preventing access to the first repository by an external user;
linking a content item maintained by the first repository with a copy of the content item maintained by the second repository such that the copy of the content item is accessible by an external user subject to one or more access controls enforceable by the second installation, the copy comprising both content of the content item and a set of metadata in common with the content item at the first repository; and
synchronizing the set of metadata between the copy of the content item and the content item in the first repository, the synchronizing occurring via a push to the second installation of changes to the content item at the first repository for writing to the copy of the content item at the second repository, and via a pull to the first installation of changes to the copy of the content item at the second repository for writing to the content item at the first repository, the first installation initiating both the push and the pull.

23. A computer-implemented method comprising:
receiving, by a second installation of a content management system from a first installation of the content management, confirmation that a first repository managed by the first installation of the content management system has established authentication with a second repository managed by the second installation, the first installation being protected by a firewall preventing access to the first repository by an external user;
receiving, at the second installation, a link of a content item maintained by the first repository with a copy of the content item maintained by the second repository such that the copy of the content item is accessible by an external user subject to one or more access controls enforceable by the second installation, the copy comprising both content of the content item and a set of metadata in common with the content item at the first repository; and
synchronizing the set of metadata between the copy of the content item and the content item in the first repository, the synchronizing occurring via receipt by the second installation of a push from the first installation of changes to the content item at the first repository for writing to the copy of the content item at the second repository, and by the second installation responding to a pull to the first installation of changes to the copy of the content item at the second repository for writing to the content item at the first repository, the first installation initiating both the push and the pull.

* * * * *